Oct. 23, 1956 S. H. MAGID 2,768,107
THERMOPLASTIC SHEET MATERIAL PROVIDED WITH TUBULAR
EDGING AND METHOD OF APPLYING SAID EDGING
Filed July 13, 1953 2 Sheets-Sheet 1
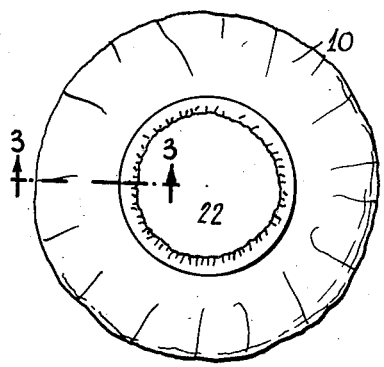
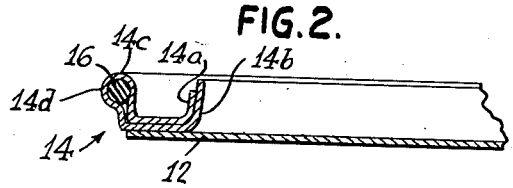
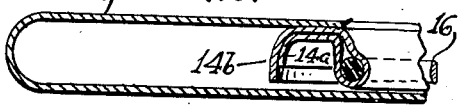
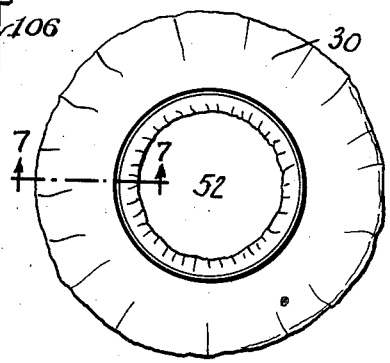
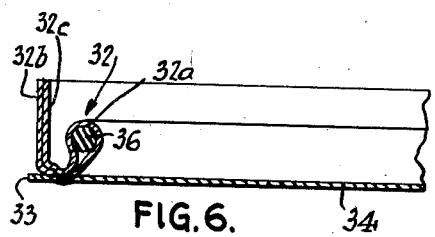
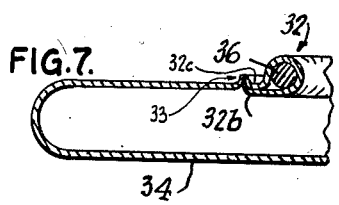
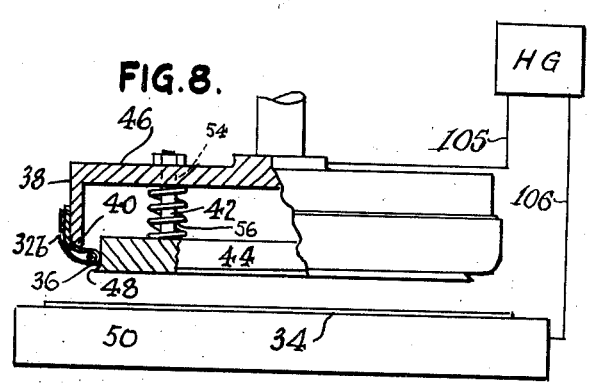
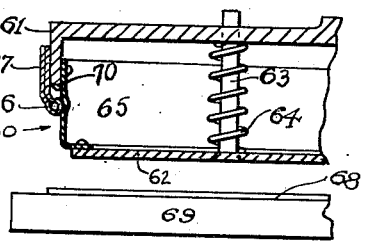
INVENTOR.
SIDNEY H. MAGID.
BY Percy Freeman
ATTORNEY.

Oct. 23, 1956
S. H. MAGID
2,768,107
THERMOPLASTIC SHEET MATERIAL PROVIDED WITH TUBULAR
EDGING AND METHOD OF APPLYING SAID EDGING
Filed July 13, 1953
2 Sheets-Sheet 2
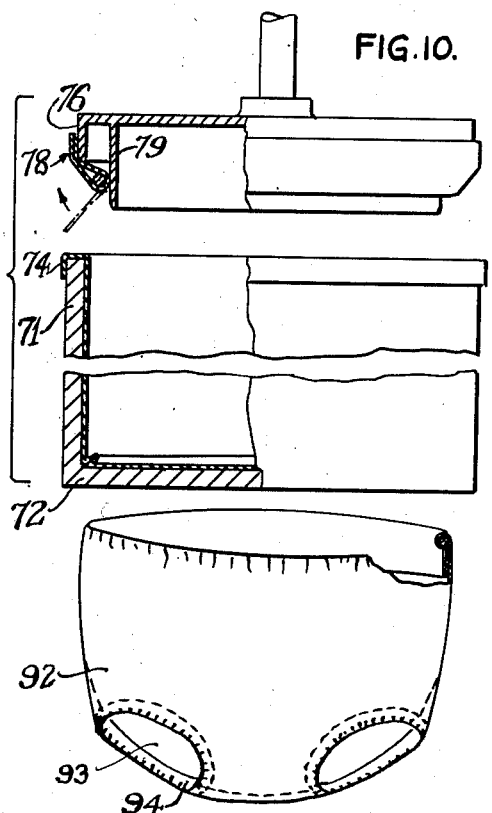
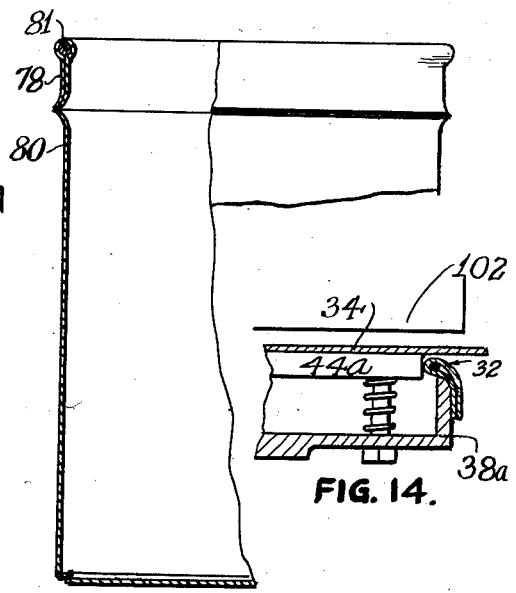
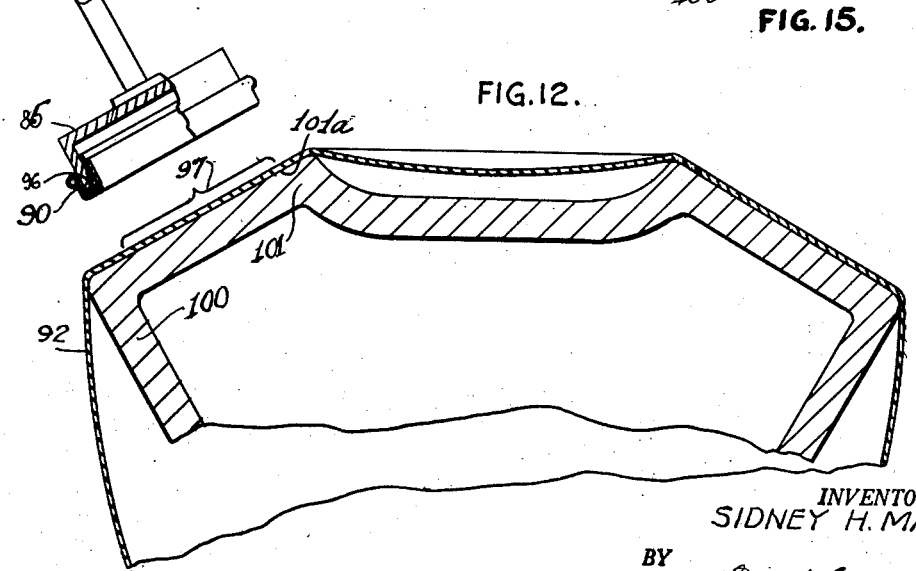
INVENTOR.
SIDNEY H. MAGID.
BY
*Percy Freeman*
ATTORNEY.

United States Patent Office 2,768,107
Patented Oct. 23, 1956

2,768,107

THERMOPLASTIC SHEET MATERIAL PROVIDED WITH TUBULAR EDGING AND METHOD OF APPLYING SAID EDGING

Sidney H. Magid, Morrisville, Pa.

Application July 13, 1953, Serial No. 367,485

21 Claims. (Cl. 154—116)

This invention relates to articles made of thermoplastic sheet material and provided with tubular edging, and to a method of applying said tubular edging thereto.

This invention involves improvements over Patent No. 2,466,643, issued to me on April 5, 1949, and Patent No. 2,490,451, issued to me on December 6, 1949.

The articles to which this invention relates are protective coverings for dishes, jars, bowls and the like, as well as bags and other containers, head coverings, baby pants and various other articles which are commonly made of thermoplastic sheet material and which are usually provided with tubular edging for one purpose or another. The tubular edging may enclose an elastic member or a drawstring or any other type of core which would serve any one of a number of different purposes or functions. The core may be incorporated therein simply for reinforcing purposes or to provide a relatively prominent bead where beads are either required or desired for various purposes. An elastic core would be employed where frictional gripping is required, as where the article comprises a bowl cover or a head covering or baby pants, etc. A drawstring would be employed in the case of a bag or similar container or other open-ended article for the purpose of drawing the bag or container opening to closed position. A rigid ring may also be used.

The principal object of this invention is the provision of an article of the character described wherein the tubular edging is attached to the article, irrespective of the shape of the article, without any ruffling or shirring or the like. This is extremely important in cases where ruffling or shirring would either destroy or impair the utility or appearance of the article. The avoidance or ruffling or shirring is essential where an air-tight or a liquid-tight seal is required between the edging and the article proper.

Another important object of this invention is the provision of a method of securing such tubular edging to the article to avoid ruffling or shirring either of the edging or the article proper. The method which is herein claimed departs from the prior art in the following manner: In the prior art, a sheet of thermoplastic material which is to form the body of a dish cover or head covering or other article is placed upon a form and the tubular edging is then formed thereon or affixed thereto. In the present method, the sheet of thermoplastic material which is to form the body of said dish cover or head covering or the like is placed flat upon a perfectly flat platen and the tubular edging is then secured thereto. If the tubular edging encloses an elastic band or a drawstring, the article may be shirred or ruffled after it is made. But since the body portion and the tubular edging were both in an unshirred or unruffled state at the time of affixation one to the other, that is they were at that time linearly coextensive, the seal or weld between the two will be tight, strong and unbroken. It will, of course, be understood that this invention does not require the entire sheet of body material to be maintained on a flat plane at the time the tubular edging is secured thereto. It is sufficient, for the purposes of this invention, that that portion of the body material to which the tubular edging is to be secured is alone maintained in a perfectly flat state or, stated differently, in an unshirred and unruffled state.

Another feature of this invention is the fact that the tubular edging is secured to only one side of the body material. In the prior art, the body material is sandwiched in between the two flaps of the tubular edging. This results in serious production problems since it is difficult to maneuver the two components into sandwiched relationship. In the present invention both flaps of the tubular edging are placed flat against each other and then they are both placed against one side of the sheet of body material. An important aspect of the claimed method of attaching the tubular edging to the body material is that the two flaps of the edging are secured to each other at the same time and by the same means that they are secured to the body material. It is not necessary to prefabricate the tubular edging.

The tubular edging may be made of the same material as the body portion or of different material. For example, the tubular edging may be made of a different gauge of the same material of which the body portion is made or the gauge may be the same and the color different or the two components may be made of entirely different material. Where possible, the preferred means for securing the tubular edging to the main body of the article is heat, coupled with pressure, electronic heat being preferred. Nonetheless, a cement or an adhesive may be employed to attach the two components together and this is especially true in connection with material that cannot be readily heat sealed or welded.

The invention is illustrated in the accompanying drawing, in which:

Fig. 1 is a view of a dish cover or the like made in accordance with this invention.

Fig. 2 is an enlarged fragmentary section showing the tubular edging and flat disc of which said dish cover is made and showing how said tubular edging is secured to one face of said flat disc along its peripheral edge.

Fig. 3 is an enlarged fragmentary section showing said peripheral edge of the disc and the tubular edging secured thereto turned inwardly to form the opening of said dish cover.

Fig. 4 is a sectional view, somewhat diagrammatic, showing how the tubular edging as shown in Figs. 2 and 3 is formed and secured to the peripheral edge of the disc, and showing apparatus for accomplishing this result.

Fig. 5 is a view similar to that of Fig. 1 but showing a dish cover or the like with a slightly modified construction.

Fig. 6 is a view similar to that of Fig. 2 showing how the tubular edging is placed in relationship to the peripheral edge of the disc, said relationship being the opposite to that shown in Fig. 2.

Fig. 7 is a view similar to that of Fig. 3 showing the modified construction and relationship between the tubular edging and the peripheral edge of the disc.

Fig. 8 is a view somewhat similar to that of Fig. 4 but showing the formation of the tubular edging of Figs. 6 and 7 and how said tubular edging is applied to the disc.

Fig. 9 is a fragmentary sectional view showing a modified form of apparatus.

Fig. 10 is another sectional view showing how a further modified form of apparatus may be used to secure the edging to a bag-shaped member for the purpose of making a container of the type shown in Fig. 11.

Fig. 11 is a fragmentary sectional view through a container made on the apparatus shown in Fig. 10.

Fig. 12 is a fragmentary section showing the making of another article in accordance with this invention and with apparatus somewhat similar to that shown in Fig. 8.

Fig. 13 is a perspective view of an example of an article made on the apparatus shown in Fig. 12, part being broken away and shown in section.

Fig. 14 is a fragmentary sectional view of a further modification of the apparatus wherein a single form is utilized for supporting the disc and the tubular edging preparatory to uniting them.

Fig. 15 is a sectional view of an article made in accordance with the invention wherein a cored flexible supporting band is secured to a rigid thermoplastic disc inward of the peripheral edge thereof.

Referring now to Figs. 1, 2, 3 and 4 of the drawing, it will be seen that a dish cover 10 made in accordance with this invention comprises the following component parts: A flat disc-shaped sheet 12 of thermoplastic material, a tubular edging 14 made of the same general kind of material and a core 16 which is enclosed within said tubular edging. In this form of the invention, the tubular edging is made from a strip or circular band of flat sheet material folded over upon itself as shown in Figs. 2, 3 and 4, and thereby providing upper and lower flaps or walls 14a and 14b, respectively with a tubular tunnel 14c formed between said flaps and within bight 14d. Core 16, in this case, is simply an endless rubber band and it is situated within tunnel or tube 14c.

In the making of the tubular edging, the strip or ring-shaped band of thermoplastic material is placed upon cylindrical ram 18 in the manner shown in Fig. 4. This is a heat-sealing or welding ram which causes sufficient heat to develop within the thermoplastic sheet material to plasticize it and to cause it to adhere to itself and to another sheet of plasticized thermoplastic sheet material. The core 16 is then placed upon said band of sheet material and the sheet material is folded upon itself in the manner shown in Fig. 4 to form the two flaps 14a and 14b, and the tunnel or tube 14c which encloses said core. A dry adhesive strip or band 17 may be located around the inner periphery 19 of the ram to temporarily retain flap 14b until the ram and platen are brought together for uniting the edging and the disc 12. Disc 12 is placed on platen 20 immediately below ram 18 and when the ram is moved downwardly to bring flap 14b into engagement with the top surface of disc 12, sufficient heat and pressure will be applied to the two flaps and the disc to partially plasticize them and to cause them to adhere to each other.

Due to contraction of the elastic band 16, the peripheral edge of the disc to which tubular edging 14 is now applied, is automatically turned inwardly in the manner shown in Fig. 3 to complete the dish cover shown in Fig. 1. The elastic nature and action of rubber core 16 will, of course, draw in and shir said inwardly turned peripheral edge of the disc as well as said tubular edging 14 to form the relatively small opening 22 shown in Fig. 1.

Turning now to Figs. 5, 6, 7 and 8, it will be seen that dish cover 30 resembles dish cover 10 except that a different method is employed in securing its tubular edging 32 to its disc 34. In Fig. 4, it will be seen that the free edges of the tubular edging are inwardly directed with respect to its bight, and in Fig. 8, it will be seen that the free edges of the tubular edging are outwardly directed with respect to its bight. More particularly, core 36 is mounted within bight 32a formed between flaps 32b and 32c, respectively. The edges of said flaps are made to coincide, substantially, with the peripheral edge 33 of disc 34 in the finished article (Fig. 7). The apparatus shown in Fig. 8 for making the tubular edging and attaching it to the disc consists of a ram 38 of generally cylindrical shape with a taper 40 along its lower outer edge. This taper reduces the thickness of the cylindrical wall of said ram and concentrates the heat so that the effect is not only to seal and secure the flaps to each other and to the disc but also to remove all surplus material from the edges of said tubular edging and said disc.

Bolts 42 support a disc-shaped platen 44 from the top wall 46 of the ram. An annular shoulder 48 is provided along the lower peripheral edge of said platen 44 to support the bight 32a of the tubular edging and its enclosed core 36. Disc 34 is placed upon a platen 50 corresponding to platen 20 shown in Fig. 4. As the ram descends, its tapered circular edge brings flap 32b of the tubular edging into engagement with the top surface of disc 34 and sufficient heat and pressure are applied to both flaps and to the disc to partly plasticize them and cause them to adhere to each other. As above stated, the taper 40 will cause a sufficient concentration of heat to facilitate removal of the surplus outer peripheral portions of the two flaps and the disc.

Due to contraction of the elastic core 36, the peripheral edge of disc 34 and its tubular edging are automatically drawn inwardly as shown in Fig. 7 to form article 30 shown in Fig. 5. That is, the elastic core will draw said peripheral edge and the tubular edging inwardly to contract the same to the proportions shown in Fig. 5 to form the relatively small opening 52 provided therein.

The apparatus shown in Fig. 8 provides for vertical movement of disc-shaped platen 44 relative to ram 46. It has been stated that bolts 42 support platen 44 from the top wall 46 of the ram. These bolts are slidably movable through holes 54 in said top wall and compression springs 56 are mounted on said bolts between the platen 44 and the top wall 46 to urge said platen downwardly but to yield to upwardly directed pressure upon said platen. This occurs when platen 44 engages the top surface of disc 34 on the downward movement of the ram. The weight of platen 44 and the tension of springs 56 will cause said platen 44 to tightly hold disc 34 flat against platen 50. Further downward movement of the ram to its fully operative position will have no effect upon platen 44 since said platen will be in its lowermost position. Instead, springs 56 will contract and bolts 42 will project upwardly from the top wall of the ram.

The apparatus shown in Fig. 9 is somewhat similar to that shown in Fig. 8, with respect to the bolts 63 and compression springs 64. In this instance, the platen 62 is yieldingly supported from the ram 61 by the flexible band 60 which may be of leather or other similar material so that its annular wall 65 will yield inwardly somewhat in the manner of a bellows gusset as the core 66 contracts within the tunnel of the tubular edging 67. Now as the ram 61 is brought down toward the disc 68 lying on platen 69, its tapered circular edge brings the flaps of the tubular edging into engagement with the top surface of the disc 68, and sufficient heat and pressure are applied to both flaps and to the disc to partly plasticize them and cause them to adhere to each other. As with respect to Fig. 8, the tapered circular edge will cause a sufficient concentration of heat to facilitate the removal of the surplus outer peripheral portions of the two flaps and the disc.

It will be understood, of course, that as platen 62 contacts disc 68, the annulus 65 will flex inwardly allowing the tunnel to contract so that the taper 70 will contact the flaps and clear the core 66 and its tunnel.

The apparatus shown in Fig. 10 is somewhat similar to that shown in Fig. 8 with the exception, however, that a cylindrical member 71 having a bottom wall 72 is provided in place of platen 44. A bag-shaped sheet of thermoplastic material 74 is placed within said cylindrical member 71 and a peripheral edge of said bag-shaped member 74 is curled over the peripheral edge of said cylindrical member in the manner shown in Fig. 10. Ram 76 is similar to ram 38 above described, except that it includes an annular inner wall 79 instead of platen 44, and tubular edging 78 is similar to tubular edging 32 above described.

When the ram descends, the tubular edging is brought into engagement with the curled edge of bag 74 and said edging and bag are thereby firmly secured to each other in the manner above described and all surplus edges are simultaneously trimmed away.

Bag 80 shown in Fig. 11, is the end result of the process illustrated in Fig. 10. Core 81 in the tubular edging 78 may be an endless band of elastic rubber which would contract to close the bag or it may be a drawstring which could be substituted for the rubber core 81, in which case openings would be provided in the bight of the tubular edging through which the ends of the drawstring would project. In such case, the drawstring would then be pulled tight in conventional manner to close the bag. Or the core 81 might be a rigid wire core which would then produce a pail of flexible sheet material with a rigid peripheral upper edge to which a bail or handle might be attached.

In Fig. 12, a heat sealing ram 85, similar to ram 18, above mentioned, is used to affix tubular edging 90 which is similar to tubular edging 14, to one of the leg portions of a pair of baby pants 92. It will be noted that a leg opening 93 is provided in the leg portion and the marginal edge of said leg portion which encircles and defines said leg opening is identified in the drawing by the reference character 94. The baby pants are mounted upon a form 100 which corresponds to the extent required to the shape of the pants. A platen portion 101 is provided on said form to correspond to each of the leg portions of the pants, and it will be noted that this platen portion is a substantially cylindrical formation with a flat end portion 101a situated on an inclined plane. It is upon this inclined flat portion that the marginal edge 94 of the pants is drawn flat in readiness for the step of affixing the tubular edging 90. The ram 85 is also situated on an inclined plane and it is movable in perpendicular relation to the flat surface 101 of form 100. The tubular edging is thereby brought into engagement with the marginal portion 94 and they are heat sealed or welded together.

It will be noted that an inner bevel 96 is provided along the lower peripheral edge of ram 85. This contrasts with the outer bevel 40 of ram 38. The effect of providing an inner bevel is to concentrate heat on the inner rather than the outer side of the ram in order to trim away the inner surplus material encompassed within the bracket 97 on both the tubular edging and the marginal portion 94.

In Fig. 14 there is shown an arrangement similar to, but reversed from that shown in Fig. 8. With respect to Fig. 8, there was a platen 44 and another platen 50 upon which the disc 34 was placed. However, with the apparatus shown in Fig. 14, it is but necessary to place the disc 34 upon platen 44a so that ram 38a may be moved upwardly toward electrode 102 to seal the tubular edging 32 to the disc 34.

In Fig. 15, further example is shown of an article which can be made by the methods and apparatus disclosed. A rigid thermoplastic disc 105 which may be a transparent light diffuser, is shown as having affixed to it by heat sealing, in any of the manners heretofore described, a tubular edging 106 with an elastic core 107 which may be used as a means for supporting the diffuser 105 upon a light reflector 108, such as is used for photographic flash lamps.

It will be understood that any of the well known methods of providing heat for heat sealing may be used.

In Figs. 4 and 8 there is shown diagrammatically one method of applying heat for this purpose, by using a high frequency heat generator HG connected to the respective forms or electrodes by conductors 105, 106.

The foregoing is illustrative of preferred forms of this invention, and it will be understood that these preferred forms may be modified and other forms may be provided within the broad spirit of the invention and the broad scope of the claims.

For convenience of nomenclature, it is intended that "an article of the character described" shall mean (a) a flat 2-dimensional plane form without regard to thickness of material, wherein the tubular edging set forth herein is attached either to the outside peripheral edge of said two dimensional form, as, for instance, the disc 34 in Fig. 7; or (b) is attached to any part of the surface of said flat plane within the confines of said peripheral edge, as, for instance the disc 105 in Fig. 15; or (c) a three-dimensional form wherein said tubular edging is attached to the peripheral edge of any opening in said form, as for instance 80 in Fig. 11; or (d) on any part of the surface of said three-dimensional form, as for instance, 92 of Fig. 12.

Having thus described my invention, what I claim as new and desire to secure by Letters Patent, is:

1. A method of making articles of the character described having a main body portion and tubular edging secured thereto, said method comprising the steps of mounting on a support, that part of the main body portion to which the tubular edging is to be secured, mounting on a second support that part of the tubular edging which is to be secured to the main body portion, moving at least one of said supports toward the other support to bring the said parts of the tubular edging and the main body portion into face-to-face engagement and then uniting them to each other.

2. The method of making articles as called for in claim 1, in which the uniting step is accomplished by high frequency heating.

3. The method of making articles as called for in claim 1, in which the uniting step is accomplished by heat sealing means.

4. The method of making articles as called for in claim 1, with the further step of removing the surplus material from the main body portion.

5. A method of making articles of the character described having a main body portion and tubular edging secured thereto, said method comprising the steps of holding parts of said main body portion and said tubular edging flat against each other on parallel planes to avoid ruffling or shirring and then securing said parts to each other while they are maintained in such relationship.

6. The method as called for in claim 5, wherein the securing step is performed by heat sealing.

7. A method of making articles of the character described having a thermoplastic main body portion and thermoplastic tubular edging secured thereto, said method comprising the steps of holding parts of said main body portion and said tubular edging in face-to-face engagement on substantially parallel planes and applying pressure and heat to said parts to weld them together while they are maintained in such relationship.

8. A method of making articles of the character described having a main body portion of thermoplastic material and at least one separate annular edging of thermoplastic material, secured thereto, said method comprising the steps of mounting on a support that part of the main body portion to which the annular edging is to be secured, mounting on a second support that part of the annular edging which is to be secured to the main body portion, moving at least one of said supports toward the other support to bring said parts of the annular edging and the main body portion into face-to-face engagement, and then uniting said edging and the main body portion to each other by applying heat and pressure.

9. The method as set forth in claim 8, wherein the uniting step is performed simultaneously on all portions of the contacting faces by high frequency heat.

10. A method of making articles of the character described having a main body portion of thermoplastic material and at least one separate annular edging of thermoplastic material secured thereto, said method comprising the steps of mounting on a support the annular edging which is to be secured to the main body portion, then mounting thereon that part of the main body portion to which the annular edging is to be secured into face-to-face engagement with said part of the main body portion, and then uniting said edging and the main body portion to each other by applying heat and pressure.

11. The method as set forth in claim 10, wherein the uniting step is performed simultaneously on all portions of said contacting faces by high frequency heat.

12. An article of manufacture comprising a blank of thermoplastic material, an annular edging attached to one face of said blank, said annular edging being formed of a continuous band of flexible thermoplastic material folded circumferentially upon itself to provide two flaps and a bight therebetween, a continuous elastic element in said bight and having said flaps secured in face-to-face engagement to themselves and to only one surface of said blank.

13. An article of manufacture comprising a blank of thermoplastic material, an annular edging attached to one face of said blank, said annular edging being formed of a strip of flexible thermoplastic material with overlapping ends, said material folded upon itself to provide two flaps and a bight therebetween, a continuous elastic element in said bight and having said flaps secured in face-to-face engagement to themselves and to only one surface of said blank.

14. An article of manufacture comprising a disc-shaped blank of thermoplastic material having attached to its outer peripheral edge a flexible thermoplastic binding, said binding comprising a continuous annular band folded circumferentially upon itself to provide two flaps and a bight therebetween, and a continuous elastic element within said bight, said flaps being secured in face-to-face engagement to themselves and to only one surface of said blank, with the edges of said flaps and of said blank contiguous and coinciding.

15. An article of manufacture comprising a flat blank of thermoplastic material having an opening therethrough disposed anywhere within the boundary of said blank, and having attached to the peripheral edge of the opening a flexible thermoplastic binding, said binding comprising a continuous annular band folded circumferentially upon itself to provide two flaps and a bight therebetween, and a continuous elastic element within said bight, said flaps being secured in face-to-face engagement to themselves and to only one surface of said blank, with the edges of said flaps and the peripheral edge of the opening in the blank being contiguous and coinciding.

16. An article of manufacture comprising a disc-shaped blank of thermoplastic material having attached to its outer peripheral edge a flexible thermoplastic binding, said binding comprising a continuous annular band folded circumferentially upon itself to provide two flaps and a bight therebetween, and a continuous elastic element within said bight, said flaps being secured in face-to-face engagement to themselves and to only one surface of said blank.

17. An article of manufacture comprising a flat blank of thermoplastic material having an opening therethrough disposed anywhere within the boundary of said blank, and having attached to the peripheral edge of the opening a flexible thermoplastic binding, said binding comprising a continuous annular band folded circumferentially upon itself to provide two flaps and a bight therebetween, and a continuous elastic element within said bight, said flaps being secured in face-to-face engagement to themselves and to only one surface of said blank.

18. An article of manufacture comprising a hollow cylindrical body of thermoplastic material having attached to itse peripheral edge a flexible thermoplastic binding, said binding comprising a continuous annular band folded circumferentially upon itself to provide two flaps and a bight therebetween, and a continuous elastic element within said bight, said flaps being secured in face-to-face engagement to themselves and to only one surface of said blank, with the edges of said flaps and of said blank contiguous and coinciding.

19. An article of manufacture comprising a hollow cylindrical body of thermoplastic material having attached to its peripheral edge a flexible thermoplastic binding, said binding comprising a continuous annular band folded circumferentially upon itself to provide two flaps and a bight therebetween, and a continuous elastic element within said bight, said flaps being secured in face-to-face engagement to themselves and to only one surface of said blank.

20. An article of manufacture comprising a blank of thermoplastic material, an annular edging attached to one face of said blank, said annular edging being formed of a band of flexible thermoplastic material folded circumferentially upon itself to provide two flaps and a bight therebetween, a core in said bight and having said flaps secured in face-to-face engagement to themselves and to only one surface of said blank.

21. As an article of manufacture a three-dimensional body made of thermoplastic material having attached to its surface intermediate its boundaries, a flexible thermoplastic element, said element comprising a continuous annular band folded circumferentially upon itself to provide two flaps and a bight therebetween and a continuous elastic element within said bight, said flaps being secured in face-to-face engagement to themselves and to said surface.

References Cited in the file of this patent

UNITED STATES PATENTS

| | | |
|---|---|---|
| 1,322,855 | Whitmore | Nov. 25, 1919 |
| 1,400,806 | Daniels | Dec. 20, 1921 |
| 2,028,454 | Johnson | Jan. 21, 1936 |
| 2,112,706 | Moore | Mar. 29, 1938 |
| 2,138,610 | Overly | Nov. 29, 1938 |
| 2,142,301 | Buchalter | Jan. 3, 1939 |
| 2,381,951 | Griswold | Aug. 14, 1945 |
| 2,432,662 | Gardner | Dec. 16, 1947 |
| 2,490,451 | Magid | Dec. 6, 1949 |
| 2,499,908 | Figge | Mar. 7, 1950 |
| 2,565,219 | Gardiner et al. | Aug. 21, 1951 |
| 2,658,543 | Budnick | Nov. 10, 1953 |